United States Patent [19]

Hishinuma et al.

[11] Patent Number: 4,812,932

[45] Date of Patent: Mar. 14, 1989

[54] VIBRATION PROOF SUPPORTING STRUCTURE FOR DISK-TYPE INFORMATION MEMORY UNIT

[75] Inventors: Toshio Hishinuma, Kanagawa; Atsushi Katsuta; Takeharu Tajima, both of Odawara, all of Japan

[73] Assignee: Hitachi, Ltd., Tokyo, Japan

[21] Appl. No.: 70,935

[22] Filed: Jul. 8, 1987

[30] Foreign Application Priority Data

Jul. 9, 1986 [JP] Japan .................. 61-159607

[51] Int. Cl.⁴ .................. G11B 5/012; G11B 23/02
[52] U.S. Cl. .................. 360/97.01; 360/98.01; 360/99.01; 248/566; 248/611
[58] Field of Search .................. 360/97–99; 310/91; 248/566, 568, 569, 570, 562, 563, 610, 611, 612, 613

[56] References Cited

U.S. PATENT DOCUMENTS

| | | | |
|---|---|---|---|
| 3,577,133 | 5/1971 | Garfein et al. | 360/97 |
| 3,643,242 | 2/1972 | Bryer | 360/98 |
| 3,768,083 | 10/1973 | Pejcha | 360/98 |
| 3,849,800 | 11/1974 | Cuzner et al. | 360/97 |
| 3,886,595 | 5/1975 | Swaim et al. | 360/98 |
| 4,062,049 | 12/1977 | Dirks | 360/98 |
| 4,252,327 | 2/1981 | Elliott et al. | 360/97 |
| 4,338,642 | 7/1982 | Clark et al. | 360/98 |
| 4,553,183 | 11/1985 | Brown et al. | 360/98 |
| 4,568,988 | 2/1986 | McGinlay et al. | 360/77 |
| 4,632,372 | 12/1986 | Nakajima et al. | 248/562 |
| 4,666,016 | 5/1987 | Abe et al. | 248/566 |
| 4,717,130 | 1/1988 | Barkhage | 248/611 |
| 4,719,526 | 1/1988 | Okita et al. | 360/97 |

FOREIGN PATENT DOCUMENTS 2355209 2/1978 France .................. 248/568

OTHER PUBLICATIONS

Rachui et al., "Torsion Shockmount Lock," IBM Technical Disclosure Bulletin, vol. 27, No. 3, Aug. 1984, pp. 1728–1729.

Primary Examiner—John H. Wolff
Assistant Examiner—Matthew J. Bussan
Attorney, Agent, or Firm—Fay, Sharpe, Beall, Fagan, Minnich & McKee

[57] ABSTRACT

Disclosed is a file memory unit having a casing for accommodating a head positioning mechanism and a magnetic recording disk virtually in sealed manner, and a frame for supporting the casing resiliently. The unit has the provision of a shock absorbing facility for absorbing the vibration created by the head positioning mechanism and the vibration and impact applied from the outside. The shock absorbing facility has a unitary structure having a first spring constant for absorbing relatively small vibration created by the casing, a second spring constant for absorbing the vibration applied from the outside, and a third spring constant for absorbing the impact applied from the outside.

10 Claims, 7 Drawing Sheets

VIBRATION PROOF SUPPORTING STRUCTURE FOR DISK-TYPE INFORMATION MEMORY UNIT

BACKGROUND OF THE INVENTION

This invention relates primarily to a file memory unit having a head positioning mechanism, the memory unit being for example a magnetic disk memory unit with the ability of absorbing the vibration and impact attributable to the positioning operation for the achievement of fast and accurate head positioning.

Magnetic disk memory units have a dominant role as file memories in information processing systems in recent years. The file memory system is under way of innovation for the enhancement of compactness, recording density, capacity and access time. A trend in the magnetic disk memory unit is the prevalence of compact magnetic disk memory units which drive magnetic disks of eight inches, five inches or three inches in diameter. These magnetic disk memory units are intended to share the physical standard (dimensions, etc.) and electrical interface with flexible disk memory units, and therefore they must be extremely compact and yet capacious by high-density recording.

Magnetic disk memory units with a relatively low recording density, low capacity and low access speed employ a stepper motor head drive system, while those with a high recording density, high capacity and high access speed employ a drive system using a voice coil motor which operates by the principle of a loud speaker. A magnetic disk memory unit in general has a spindle which provides an accurate, rotational support for a plurality of magnetic disks, a magnetic head which records or retrieves information on a concentric track on the disk surface, and a head positioning mechanism which brings the magnetic head fast and accurately to an intended track. Head positioning systems include one in which the head positioning mechanism is combined with an auxiliary position sensing mechanism by which the head position is detected during the positioning operation, and another one in which one or more magnetic disks have a prerecorded reference position track (servo track) which by being read provides the accurate head position during the positioning operation.

In order for the magnetic disk file memory to have an enhanced capacity and the ability of fast and accurate information recording and retrieval, the track density is increased or track width is narrowed to achieve an increased recording density on each disk surface and a powerful voice coil actuator is used for moving and repositioning the magnetic head in thedisk radial direction quickly and accurately. The track seek operation by the voice coil actuator induces an enormous shock to the stator supporting member, imposing the adverse effect on the head positioning accuracy. The following are conventional techniques for getting rid of this problem.

(A) Isolation or alleviation of the vibration source (reactive force) attributable to a linear motion actuator As an example of this technique, there is described in U.S. Pat. No. 3,643,242 the provision of a pair of guide rails for supporting the stator of the linear voice coil actuator constituting the magnetic head positioning mechanism in parallel to the track access direction (impact direction) so that the vibration sourcing stator is isolated movably from the base (chassis), in conjunction with a resilient shock absorber for removing a small residual movement.

There is known a technique of reducing the residual vibration by isolating the vibration sourcing voice coil actuator from the magnetic head, as disclosed for example in U.S. Pat. Nos. 3,768,083 and 3,886,595.

Another example is disclosed in JP-A-No. 54-130408 (u), in which the vibration sourcing linear actuator has its stator loaded by a free-motion damping mass for sharply damping the vibration to thereby enhance the head positioning accuracy.

A more recent technique for directly shutting out or alleviating the vibrating source attributable to a rotary motion actuator is described for example in JP-A-No. 59-210573, in which the rotary actuator constituting the head positioning mechanism has its stator supported rotatably about the output shaft, with a damping member being put to the stator so that the post-positioning impact is absorbed, to thereby achieve the accurate head positioning. A technique similar to the above one is described in detail in JP-A-No. 59-198567 and JP-A-No. 59-22265.

(B) Indirect alleviation of vibration source

Techniques for reducing the residual vibration are described in detail in JP-A-No. 59-71169, JP-A-No. 59-210577, JP-A-No. 59-121664 and JP-A-No. 60-10466 and JP-A-No. 59-180269 (U). In these magnetic disk units, an electrical position correcting system and a mechanical damping member are combined in general with the intention of ensuring or enhancing the positioning accuracy against the external vibration and impact. These shock-proof techniques are applied not only to magnetic disk memory units but recently also to audio optical disk units (compact disk players) installed in automobiles. Advanced audio optical disks have a track pitch of as small as 1.6 $\mu$m, and to cope with this the system has the enhanced tracking accuracy in a low frequency range using a reinforced servo mechanism for the pickup head, while shutting out the external high-frequency impact and vibration using a methanical damping member, as described in article entitled "Mechanical damper and electrical servo in good combination for car-mount CD players", in Nikkei Mechanical, p. 65, published on Apr. 8, 1985.

A technique of enclosing a magnetic disk, magnetic head and positioning mechanism in a sealed housing and supporting the housing resiliently by a frame is described in U.S. Pat. No. 4,568,988 and U.S. patent application Ser. No. 828,519.

Magnetic disk memory units based on the foregoing conventional techniques employ various means for supporting the stator of the voice coil actuator so as to shut out the impact and vibration in the positioning operation, and therefore the increased parts count results in a degraded reliability as well as an increased manufacturing cost of the overall system. Moreover, in the system having a magnetic head positioning mechanism within a sealed head-disk assembly (HDA), components in vibration and resilient member wear down to create dusts within the sealed HDA, which significantly deteriorates the reliabilty of the overall system. These are the problems in shutting out directly or indirectly the impact and vibration of the stator of the vibration sourcing actuator.

The following describes in further detail the problems of magnetic disk memory units employing the aforementioned conventional head positioning mechanism.

(a) A tracking control mechanism employing a rotary voice coil actuator for implementing the magnetic head positioning operation is shown in FIG. 2. In the mechanism, a magnetic head 3 is supported by a flat-spring gimbal 2 at the end of a carriage 1. The carriage 1 is swung in the direction shown by the arrow 13 by the positioning mechanism including a voice coil motor 5 which produces a drive force by the electromagnetic action between a magnet and coil to provide a reaction force applied to the base in the direction of the arrows 17, so that the magnetic head 3 traverses over a magnetic disk 4 rotating on a spindle 11. The mechanism is assembled on a base 7.

The recent head positioning system having the above-mentioned mechanism is capable of detecting a positioning error of the head on the disk surface as small as 0.1 $\mu$m by use of a magnetic head (servo head) dedicated to pick up positional information (servo track positional information) which has been recorded on a specific surface of the magnetic disk 4 in the manufacturing process. This tracking system has a detected positioning error fed back through a servo compensation circuit to the voice coil motor drive circuit to form a closed-loop servo system. The system often lacks the gain margin at the signal frequency coincident with the resonant frequency of the structure including the carriage 1, resulting in a problem of instability of the servo system.

When the magnetic disk memory unit operates to move the head 3 from one track to another on the disk surface as shown in FIG. 3A (this is called "seek operation"), it takes time called "access time". The access time consists of a transport time and a settling time at the end of the positioning operation as shown in the lower section of FIG. 3A, which also shows the head moving speed in the seek operation. The transport time is a length of time after the head has started moving until it reaches a point slightly short of the target position under control of the velocity control loop, and this time length is determined primarily from the maximum power exerted by the voice coil motor and the inertia of the moving parts. The settling time is a length of time expended during the settling period after control has been switched from velocity control to position control, and therefore it depends on the characteristics of the positioning control system. Namely, the positioning control system must also meet the requiremet of settling time length.

(b) A vital factor pertinent to the S/N ratio of the head reproduction signal is the head positioning accuracy in the track traversing direction. In retrieving data which has been recorded on a certain track of the magnetic disk, unless the head is positioned right on the track, the reproduced signal has a degraded S/N ratio, which possibly results in the misreading of data or even in the reading of data on the adjacent track. The head positioning error at recording will deteriorate the record of data on the adjacent track. The HDA (head-disk assembly) components, even in the keep-track mode instead of the seek operation, are subjected to vibration in a wide frequency range from a low frequency created by an eccentric disk to a frequency above 100 Hz attributable to the bearing. These frequency components combine with one another to create eventually a relative displacement $\delta$ which is a function of the frequency between the head and track on the disk surface.

A high-speed access operation of the carriage 1 has the adverse effect on the head positioning operation. The seek operation consists of the acceleration, steadyspeed running and deceleration for the carriage 1, and it imposes an enormous impact reaction force on the chassis 7 where the positioning mechanism is fixed. Repetitive seek operations for one track at a constant interval causes the HDA to undergo the vibration of a constant frequency, and the effect will be significant if it coincides with the resonant frequency of HDA. These phenomena can be observed as a large-amplitude, damped oscillation waveform with low freqency components (25-30 Hz) during the settling time when the HDA is supported with a rigid frame structure. In summary, the HDA in the magnetic disk memory unit has the adverse effects on the head positioning accuracy in both the keep-track and seek operations.

(c) In order to absorb the HDA sourcing vibration and external vibration, a small HDA is generally fixed to the frame through a shock absorbing member, as shown in FIG. 4. In the figure, the HDA 9 has the end section coupled to the frame 10 through the shock absorbing member 8. The shock absorbing member 8 has a large spring constant so that it shuts out or alleviates extensive vibration frequencies up to as high frequency as possible. On this account, the absorbing member 8 has a relatively high rigidity, and when the amount of movement compensating for the displacement created by the impact is applied directly to the HDA 9, the shock absorbing member 8 moves only slightly in the direction shown by the arrows A and B together with the HDA 9, which then suffers a reactive force as observed in the damped oscillation waveform in response to the occurrence of acceleration of the chassis 7 in the settling time as shown in FIG. 5, and this hampers the accurate and fast positioning. The HDA 9 is fixed through a plurality of shock absorbing members 8 to the frame 10, which is less rigid and therefore bent as shown by the dashed line and the arrow in FIG. 4 by application of a shock, and the reactive force by the bend further deteriorates the positioning accuracy.

SUMMARY OF THE INVENTION

A primary object of this invention is to provide a magnetic disk memory unit having a high-accuracy positioning mechanism which behaves little residual oscillation in a low frequency range (25-30 Hz approx.) following the head positioning operation accompanied by impact.

A secondary object of this invention is to provide a magnetic disk memory unit having a head positioning mechanism which alleviates the vibration caused by the actuator positioning operation and the vibration caused by external factors by use of an improved shock absorbing member and support means for the head-disk assembly (HDA).

A tertiary object of this invention is to provide a magnetic disk memory unit having a head positioning mechanism which is compact and simple in structure, small in the number of component parts, low in manufacturing cost, and high in reliability.

A quaternary object of this invention is to provide a magnetic disk memory unit characterized in high reliability, high performance, compact and high capacity by high density recording, high access speed, and low manufacturing cost.

In order to achieve the above objectives, the inventive magnetic disk memory unit has an improved shock absorbing member for supporting the head-disk assembly (HDA) and protecting it from external disturbances, while leaving unchanged at all the head positioning mechanism within the sealed HDA, thereby accomplishing fast and accurate positioning and yet reducing the residual post-positioning oscillation.

As a first feature of this invention, a shock absorbing means having a plurality of spring constants is used to support the HDA and absorb the vibration created by the impulsive start-stop operations of the actuator in the head positioning mechanism within the sealed HDA. As a second feature of the invention, the HDA supporting and vibration absorbing means is further intended to protect the interior of HDA from external disturbances. As a third feature of this invention, the HDA sealed body is supported with a plurality of vibration absorbing means each having a plurality of spring constants including in the first stage a very small spring constant which does not quickly absorb a small displacement in the impact direction attributable to the operation of the head positioning actuator, but allows a free motion in the impact direction for the displacement, a spring constant in the second stage large enough to buffer the impact attributable to external disturbances, and a spring constant in the third stage larger enough to damp a very large impact caused by external disturbances. As a fourth feature of this invention, the HDA is supported with a plurality of shock absorbing means located near the center of gravity in the direction normal to the vibration created by the positioning operation within the HDA and located near the position suitable for impact absorbing by moving in parallel to the displacement created by the positioning operation. As a fifth feature of this invention, the shock absorbing means which supports the HDA is made up of a resilient member with superior damping characteristics and other fixing member. As a sixth feature of this invention, the HDA is fixed through a plurality of shock absorbing members to the external frame which is rigid enough not to produce a reactive force against the impact. As a seventh feature of this invention, the HDA is supported by a pin or rail structure in the direction of reactive force attributable to the head positioning mechanism and a structure for providing a gap equal in magnitude to the displacement in the direction of inteerface between the disturbance absorbing means.

DESCRIPTION OF THE PREFERRED EMBODIMENTS

Prior to the explanation of the embodiments of this invention, its principle will first be described.

A magnetic disk memory unit uses a powerful voice coil actuator in its head positioning mechanism, and when the actator moves the head with a sharp acceleration and deceleration from one track to another on the disk surface, a great impact is applied to the stator of the actuator and the chassis which mounts it. The impact causes the chassis to make a small displacement, and consequently the whole HDA moves by the amount of the displacement in the track traversing direction. If the HDA is supported with a rigid frame or the like with the intention of eliminating the displacement, a very large reactive force is created within the HDA by the shock. This reactive force is so great that it cannot be compensated using position control of the servo system.

The present invention is intended to improve the HDA supporting means so that the HDA is allowed to make a free motion without being bound by the amount of the small displacement. According to this invention, a shock absorbing member for damping or alleviating externally sourcing impact is provided, as a means for allowing the HDA to make a free motion when the whole HDA has a small displacement due to the shock of positioning operation, with 3-stage spring constants. the first stage is designed to have a very small spring constant or exert as small binding force (resilient or frictional force) as possible, with the resilient material of the shock absorbing member being made very thin or very soft in the moving direction so as to allow the movement like a free motion. This means is accomplished by making the shock absorbing member thinner in its axial section or using softer rubber so as to decrease the spring constant, or by making the arrangement for the support with a gimbal or for sliding on a metallic pin or rail. This structure prevents the reactive force from being applied to the HDA, whereby the positioning accuracy, particularly the positioning accuracy in the settling phase is improved. The structure can be arranged using a single material or the combination of several materials.

The file memory unit incorporating the inventive high-precision head positioning mechanism will now be described in detail for its specific embodiments with reference to the drawings.

Figure 1:
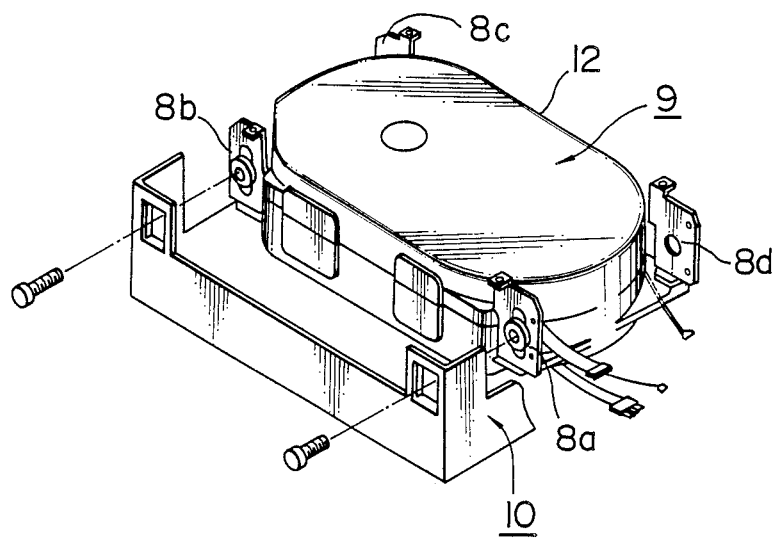
FIG. 1 is a perspective view showing the magnetic disk memory unit consisting of a head-disk assembly (HDA and its supporting frame.
Figure 2:
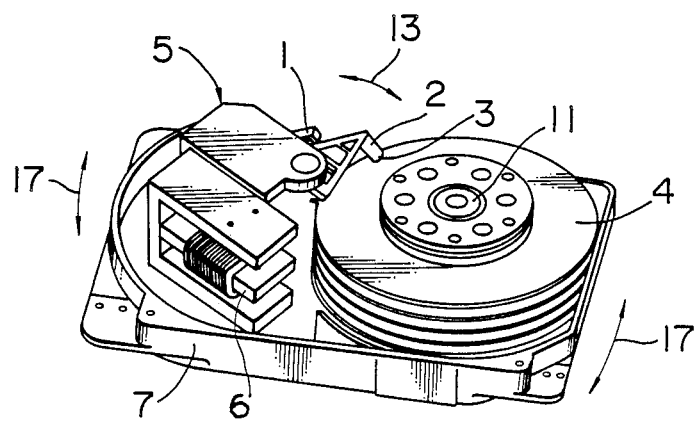
FIG. 2 is a diagram showing the internal structure of the HDA.
Figure 3A:
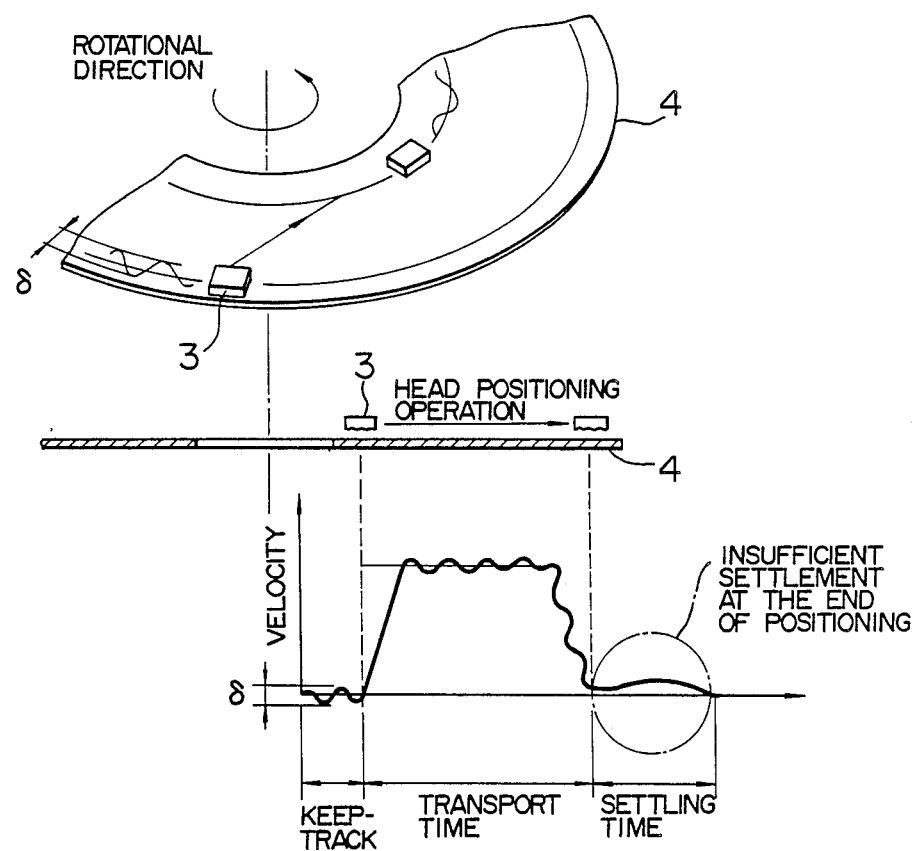
FIG. 3A is a diagram used to explain the head movement and seek time.
Figure 3B:
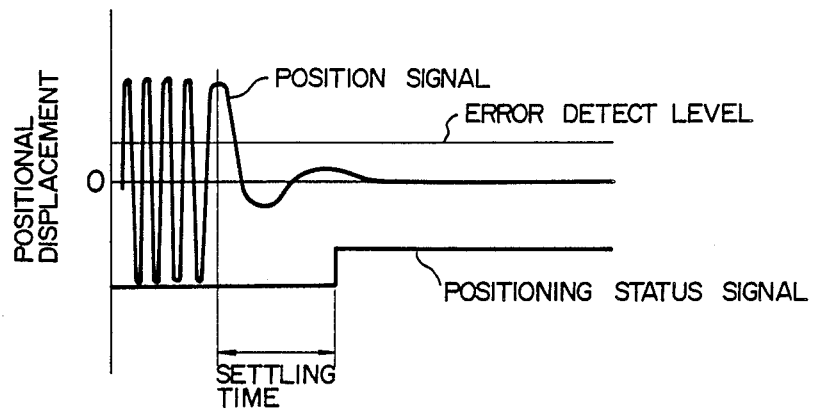
FIGS. 3B and 3C are diagrams showing the relation between the positioning waveform and settling time in the normal and abnormal operations.
Figure 3C:
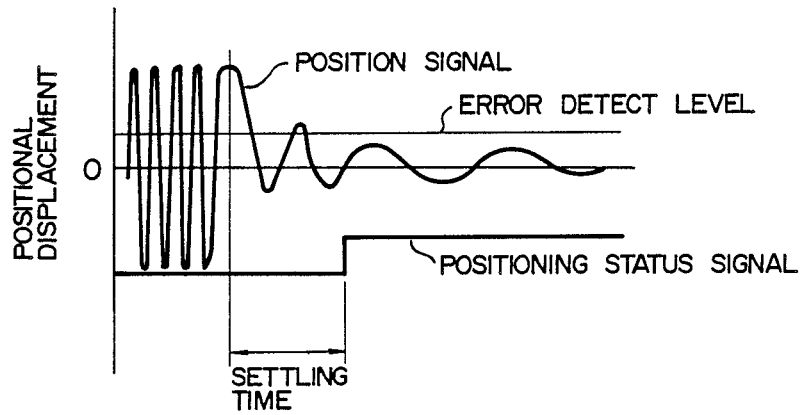
Figure 4:
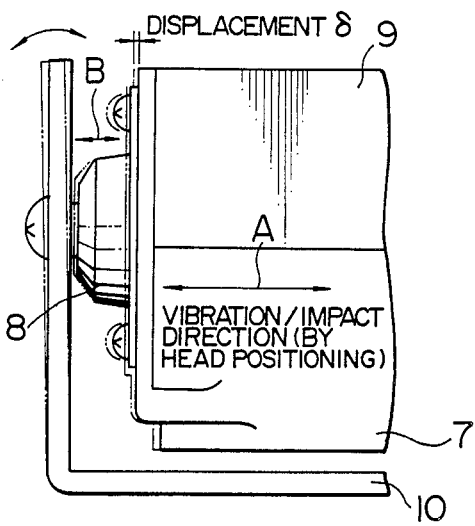
FIGS. 4 and 5 are diagrams showing the HDA-frame coupling structure and the relation between the acceleration of the chassis and position signal according to the conventional unit structure.
Figure 5:
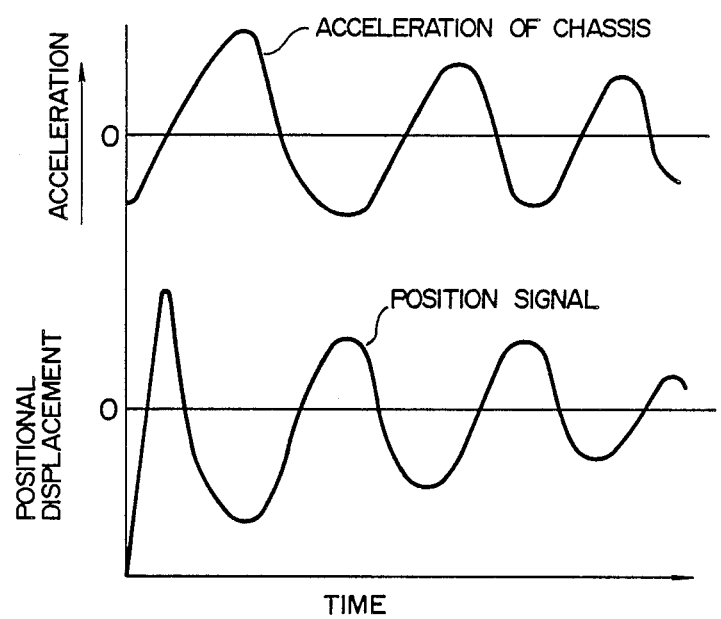
Figure 6:
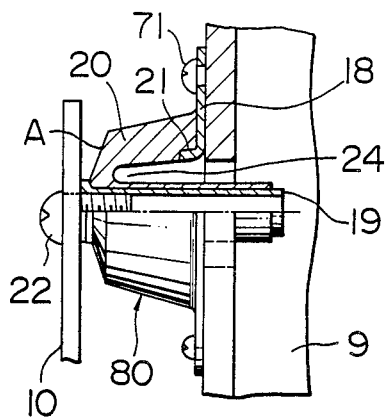
FIG. 6 is a diagram showing the shock absorbing structure embodying the present invention.

The magnetic disk memory unit to which this invention is applied has an HDA 9 which consists primarily of a spindle 11 on which a plurality of magnetic disks 4 are assembled and a head positioning mechanism 5 for implementing the fast and accurate positioning for a magnetic head 3, all fixed on a chassis 7 as shown in FIGS. 1 and 2. The assembly is sealed within a casing (shround) 12. The HDA 9 is fixed to an HDA supporting frame 10 by being cushioned with shock absorbing members 8a, 8b, 8c and 8d located at the corners of the chassis 7. The magnetic disks 4 are disposed so that they rotate about the vertical axis, and the head positioning mechanism 5 is designed to move for fast positioning the magnetic head 3 horizontally in the radial direction over the magnetic disk 4. The positioning mechanism 5 implements the fast positioning operation for the magnetic head 3 as shown by the arrow 13 in the figure. The positioning mechanism includes, as a principal component, a voice coil actuator 6, which consists of a moving voice coil and a stator magnet constituting a magnetic circuit. The HDA 9 produces a small displacement in the impact direction as mentioned previously. In this embodiment of the invention, the HDA 9 is allowed to move by the amount of small displacement δ in the impact direction almost without resistance or binding force. FIGS. 6 and 11 show the basic structure and the characteristics of the HDA support means. Shown in FIGS. 7, 8, 9, and 10 are other embodiments of the invention.

In FIG. 6, an innovative shock absorbing device 80 is made up of a first metallic fixture 18 fixed rigidly by screw 71 to the HDA 9, a second metallic fixture 19 fixed to the HDA supporting frame 10, and a viscous, resilient material 20 for isolating or shutting out the shock from the above members. The first metallic fixture 18 is provided with a drawn projection 21 for bearing the weight as heavy as the HDA 9 and preventing the drop caused by peeling or shearing external disturbances, and it is coupled firmly with the viscous, resilient material 20 by baked bonding. The second metallic fixture 19 has a shape of a flanged pipe with a threaded section used to fix firmly to the frame 10 by means of a screw 22. The fixture 19 is elongated perpendicularly to the frame 10 so that it also serves as a stopper for absorbing excessive shocks by external disturbances in the up-down and front-back directions on the drawing, and it is coupled to the viscous, resilient material 20 in the same manner as for the first metallic fixture 18.

The viscous, resilient material 20 is shaped to have a plurality (three in this embodiment) of spring constants as shown in FIG. 11. The material 20 with a cut-conical shape has a thick wall section 24 forming an internal space, and it has a very small spring constant 23 to the extent of allowing the movement in the impact direction without a significant resistance or constraint even in the occurrence of a small displacement δ of the HDA 9. The conical section of the viscous, resilient material 20 has a relatively large spring constant 25, with the intention of buffering an absorbing the impact caused by external disturbances, and it is determined from the weight of the HDA 9 and the cutoff frequency. The conical section of the viscous, resilient material 20 has an upper surface A, and it produces a spring constant region 26 which functions after the conical section, by being distorted, has come to contact with the plane of the frame 10. The third-stage spring constant 26 is large enough to damp impact frequencies when an externally sourcing excessive impact is applied, and it works in such a way that the viscous, resilient material 20 is distorted by the excessive impact onto the flat surface of the frame 10 which supports the HDA 9 and the A-plane portion shown in the figure implements a progressive damping.

The shock absorbing material 20 structured as described above is fitted in the direction for absorbing, by moving horizontally, the displacement created by the head positioning operation within the HDA, and in the location proximity to the center of gravity at right angles with the postioning impact direction so that the horizontal movement is made smooth.

Figure 12:
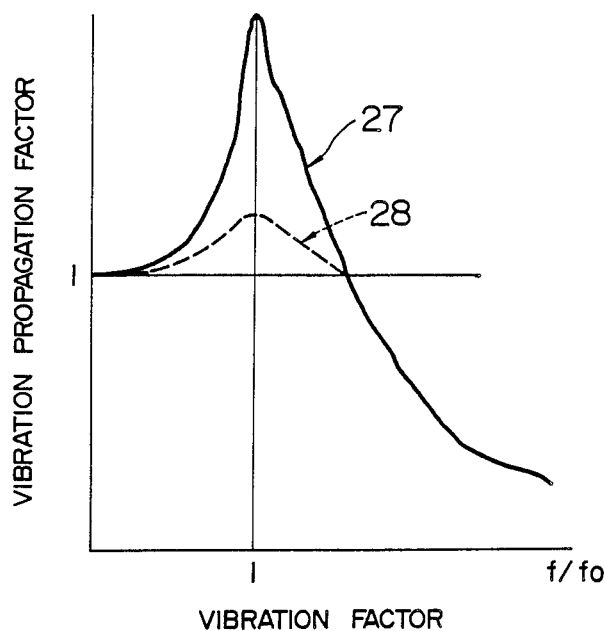
FIG. 12 is a graph showing different damping characteristics behaved by different damping materials.
Figure 13:
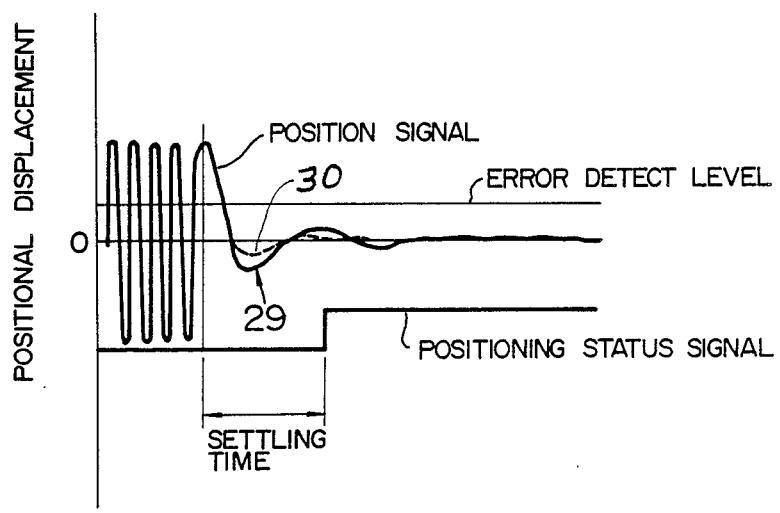
FIG. 13 is a diagram showing the positional displacement.

To make the above structure more effective and efficient, the viscous, resilient material 20 uses rubber having damping characteristics 28 of a dull resonant Q-value, instead of damping characteristics 27 of a sharp resonant Q-value for the vibration propagation factor as shown in FIG. 12. The degree of effectiveness is shown in FIG. 13. The solid line 29 shows the case of using rubber with the characteristics 27 for the inventive viscous, resilient material 20, while the dashed line 30 shows the case of using rubber with the characteristics 28, revealing that the first positioning displacement caused by the reactive force of braking is rendered extremely small. To further enhance the effectiveness, it is advisable to provide the rigidity for the frame 10 so as to eliminate the bending reactive force of the frame.

Figure 7:
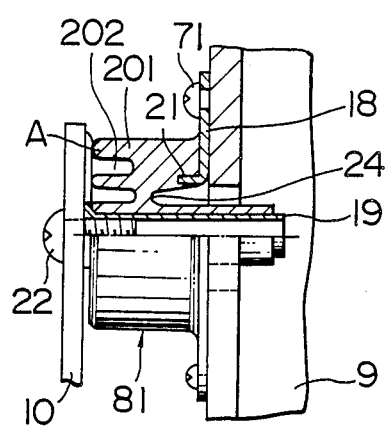
FIGS. 7 through 10 are diagrams showing another embodiments of this invention.

FIG. 7 shows another embodiment of this invention, which is intended to damp more effectively the excessive impact caused by external disturbances by providing pools of air when the A-face shown in the figure comes to contact with the surface of the frame 10. The shock absorbing device 81 of this embodiment has its viscous, resilient material 201 formed in a cylinder like shape, and has pools of air thorough a plurality of openings 202 formed on the plane in contact with the frame 10.

Figure 8:
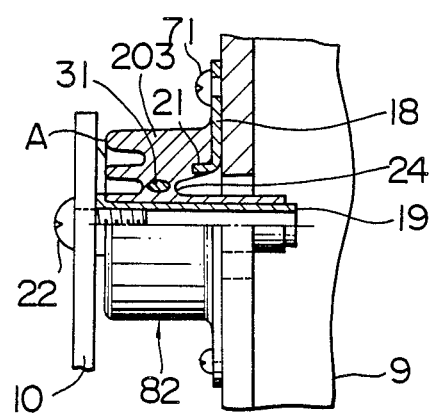

FIG. 8 shows another shock absorbing device 82, which is provided with resilient material 203 having a section 31 in which air or oil is sealed with the intention of further enhancing the effectiveness of the small displacement absorbing section 24 in the structure of FIG. 7.

Figure 9:
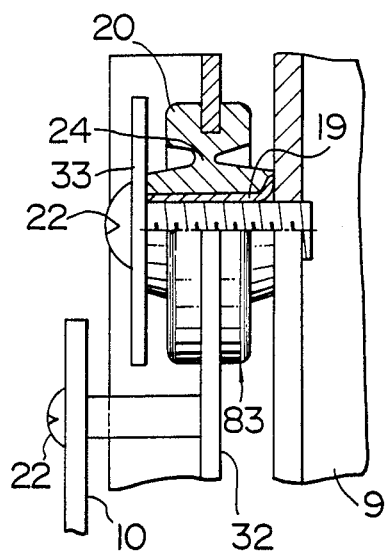

FIG. 9 shows still another embodiment of this invention, in which one or more shock absorbing devices 83 ar set on a connecting member 32, with each device 83 being fixed to the HDA 9 using a screw 22 through a damping washer 33 and the connecting member 22 being fixed to the frame 10 using the screw 22.

Figure 10:
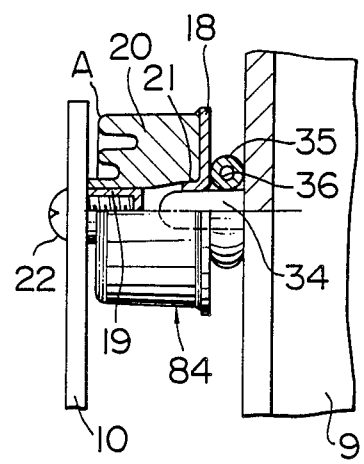
Figure 11:
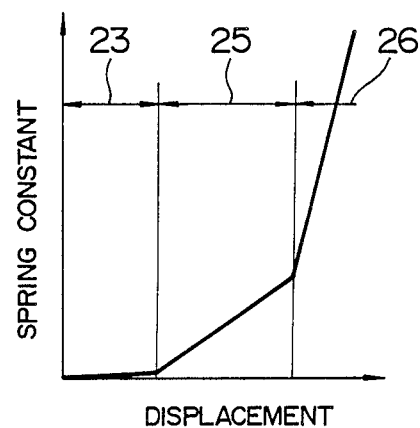
FIG. 11 is a graph used to explain the spring constant of the shock absorbing mechanism shown in FIG. 6.

In FIG. 10, a shock absorbing device 84 used against the external sourcing impact is fixed to the frame 10 using a screw 22, a rigid guide pin or rail 34 is provided to protrude from behind the HDA 9 so as to allow sliding on the internal surface of the protrusion 21 of the shock absorbing device 84, with low frictional materials such as metal and teflon being combined for this section to make it movable, and a hollow O-ring shaped shock absorbing device 35 between the metallic fixture 18 and HDA 9 is provided with a hollow 36 filled with air or oil so as to behave as the first-stage small spring constant region 23 as mentioned previously, thereby enhancing the damping characeristics. In this manner, separate devices are integrated to a unitary structure to achieve the same characteristics.

According to this invention, as described above, the sealed head-disk assembly having a head positioning mechanism has its support system improved so that a post-positioning impact is absorbed by the innovative HDA support means, thereby achieving the excellent head positioning accuracy, and a magnetic disk memory unit having a stable, accurate positioning mechanism suitable for high-density, high-capacity and high-speed operation is accomplished. Due to the fact that the only requirement is the improvement on the support system for the sealed HDA and virtually no additional component parts are needed and that the sealed HDA is supported externally, the goals of small size, low cost, high performance and high reliability can be achieved, whereby a magnetic disk memory unit having a high-accuracy head positioning mechanism of low cost and high reliability, which is the motivative object of this invention, can be accomplished.

We claim:

1. In a file memory unit having a casing for accommodating a disk-shaped recording medium and a head positioning mechanism for positioning a read-write head along a path to an intended position on said recording medium and thereby producing head vibration, and a frame for supporting said casing through a vibration and impact absorbing means, wherein said casing accommodates a rotational drive mechanism for rotating said disk-shaped recording medium and the head positioning mechanism which produces the drive force for moving said readwrite head along the path to the intended position on said recording medium, and wherein said vibration and impact absorbing means is intended to absorb the vibration along the path that is attributable to the drive force of said head positioning mechanism within said casing and the vibration along the path that is applied to said frame from the outside of the file memory unit, wherein the improvement comprises:

said vibration and impact absorbing means having a first spring constant along said path that is small enough to allow the movement of the head vibration for a small first displacement along the path, of said casing relative to said frame without encountering a substantial said vibration and impact absorbing means having a second spring constant along said path that is greater than said first spring constant for absorbing the vibration between said casing and said frame applied along said path to said frame from the outside of said frame for a second displacement along the path of said casing relative to said frame, with said second displacement occurring serially after said first displacement;

and said vibration and impact absorbing means having a third spring constant along said path that is greater than said second spring constant for absorbing a large impact applied to said frame from the outside of said frame that produces a third displacement along the path of movement of said casing relative to said frame, with said third displacement occurring serially after said second displacement.

2. A file memory unit according to claim 1, wherein said vibration and impact absorbing means comprises a first fixing member affixed to said casing, a second fixing member affixed to said frame, and a resilient member having said three spring constants located in the middle of said first and second fixing members.

3. A file memory unit according to claim 2, wherein said resilient member includes a hollow section having a cut-conical shape and at least partially determining said first spring constant, and a frame contact section with its reactive elastic force increasing progressively as it comes to contact with said frame so as to provide said third spring constant.

4. A file memory unit according to claim 2, wherein said resilient member has a cut-conical shaped hollow section for providing said first spring constant and a frame contact section formed in a plurality of protrusions for providing said third spring constant when they come into contact with the frame during the third displacement.

5. A file memory unit according to claim 2, wherein said resilient member is formed of a material having damping characteristics of dull resonance for the vibration propagation factor.

6. In a vibration proof supporting structure for a disctype information memory unit, comprising:

a casing for accommodating therein a disc-shaped recording medium and a positioning mechanism for moving a read/write head along a path for positioning said read/write head at an intended position on said disc-shaped recording medium and thereby producing head vibration;

a frame for mounting fixedly said casing, and a plurality of vibration absorbing members serving for connecting said casing and said frame to each other and serving for absorbing vibrations along the path of high frequencies generated in said casing in accompaniment to the movement of said read/write head as well as vibrations along the path of low frequencies transmitted to said frame externally thereof, wherein the improvement comprises:

each of said vibration absorbing members including a first joint portion at which said vibration absorbing member is connected to said casing and a second joint portion located in opposition to said first joint portion and at which said vibration absorbing member is connected to said frame;

each of said vibration absorbing members being of such an external configuration that the cross-section of said vibration absorbing member parallel to said first joint portion is substantially circular; and each of said vibration absorbing members having a cylindrical recess extending to a predetermined depth from said first joint portion toward said second joint portion for forming at least two separate and substantially different valued spring constants correspsonding to two serially adjacent relative movements along said path between said frame and casing and thereby correspondingly between said first joint portion and said second joint portion.

7. A vibration proof supporting structure for a disc-type information memory unit according to claim 6, said first and second joint portions of said vibration absorbing member have respective circular outer peripheries, and wherein said first joint portion has a diameter greater than that of said second joint portion.

8. A vibration proof supporting structure for a disc-type information memory unit according to claim 7, wherein said vibration absorbing member presents substantially a trapezoid shape in a plane containing a center line extending along the path from the center of said first joint portion to that of said second joint portion.

9. A vibration proof supporting structure for a disc-type information memory unit according to claim 6, said vibration absorbing member having an outline which extends from an outer peripheral point of said first joint portion to that of said second joint portion and in which a convex protrusion is formed and wherein said vibration absorbing member is substantially of a hexagonal form in a sectional plane containing a center line extending along the path from the center of said first joint portion to that of said second joint portion.

10. A vibration proof supporting structure for a disc-type information memory unit according to claim 7, wherein said first joint portion of said vibration absorbing member is secured to said casing by means of a screw through inter-position of a fitting member, and said second joint portion is secured to said frame by means of a screw.

* * * * *